Oct. 16, 1945.    P. B. DRANE    2,386,940
GASKET FOR PRESSURE RELIEF DISK VALVES
Filed Oct. 10, 1944

Phillips B. Drane
INVENTOR

ATTORNEY

Patented Oct. 16, 1945

2,386,940

UNITED STATES PATENT OFFICE 2,386,940

GASKET FOR PRESSURE RELIEF DISK VALVES

Phillips B. Drane, Tulsa, Okla.

Application October 10, 1944, Serial No. 558,029

3 Claims. (Cl. 251—160)

The invention relates to gaskets for relatively large disk valves, for instance the type used in connection with man holes of storage tanks in the oil fields, and has for its object to provide a gasket which may be applied to the disk valve for cooperating with the seat, thereby obviating the expensive structure now used, involving securing rings and screws for the channeling of the disk valve for the reception of a gasket.

A further object is to provide a disk valve gasket, particularly adapted for use in connection with relatively large valves and comprising an annular channeled shaped gasket formed from stretchable and contractible material, and adapted to be stretched over the peripheral edge of the valve so that one of its flanges will be on the upper side of the valve, and the other flange on the underside for cooperating with the valve seat.

A further object is to so shape the flanges of the gasket whereby air will be expelled therefrom or sucked therein when the valve is slammed to closed position, thereby increasing the resiliency of the gasket.

With the above and other objects in view the invention resides in the combination and arrangement of parts as hereinafter set forth, shown in the drawing, described and claimed, it being understood that changes in the precise embodiment of the invention may be made within the scope of what is claimed without departing from the spirit of the invention.

Figure 1:
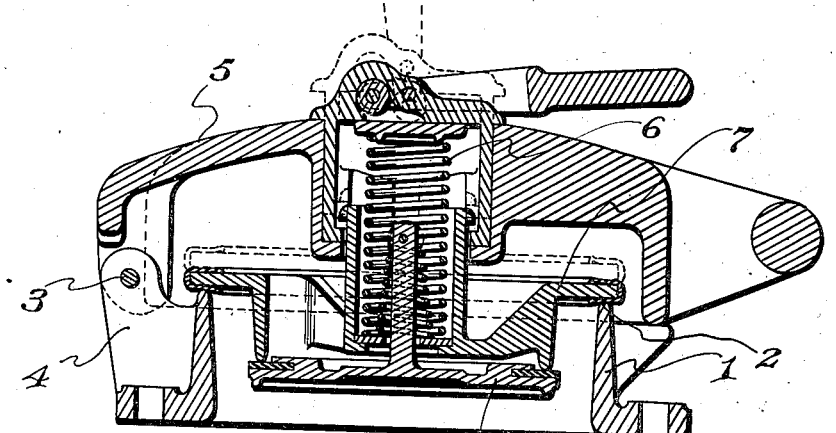
Figure 1 is a vertical longitudinal sectional view through the pressure relief valve, showing the gasket applied thereto.

The gasket hereinafter set forth and described is particularly adapted for use in connection with tank relief valves of the type shown in my Patent No. 2,183,448, issued December 12, 1939.

Referring to the drawing the numeral 1 designates the annular or otherwise shaped man hole flange of a tank and 2 the disk valve seat at the upper edge thereof. Hingedly connected at 3 to the lugs 4 of the flange 1 is a closure 5, and yieldably connected to the closure 5, by means of an expansion spring 6 is a disk valve 7. Disk valves of this type are relatively large, hence it is of prime importance to reduce the cost of applying gaskets thereto and simplifying the operation. The disk valve 7 is a pressure relief valve. Usually, in the same combination, a vacuum relief valve 8 is yieldably carried by the pressure relief valve for relieving vacuum within the tank.

Figure 2:
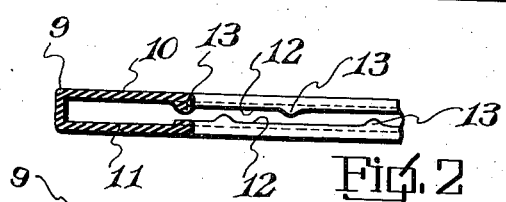
Figure 2 is a detail sectional view through one side of the gasket.
Figure 6:
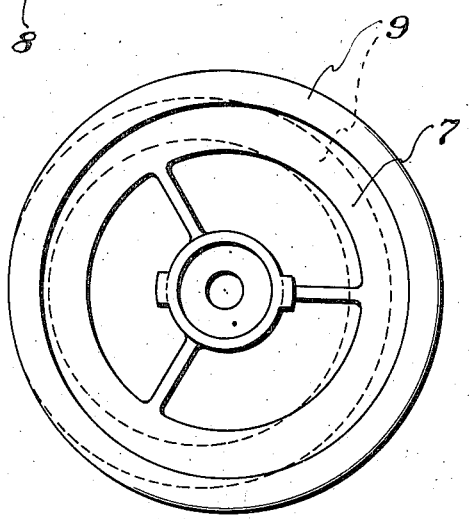
Figure 6 is a top plan view of the disk valve, showing in dotted lines the contracted sides of the gasket, and in full lines the gasket stretched over the edges of the valve.
Figure 4:
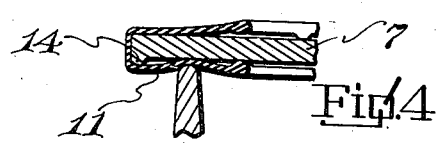
Figure 4 is a view similar to Figure 3, but showing a bead on the valve for increasing the air chamber and resiliency of the gasket when the valve is closed.

The improved gasket 9 is annular shaped and channel shaped in cross section as shown in Figure 2. The flanges 10 and 11 of the gasket are spaced apart and the gasket is made relatively small in diameter in relation to the disk valve 7 as shown in Figure 6, and stretched over the edge of the valve. On account of the size of the gasket and to make sure it closely binds against the periphery of the valve 7, the gasket is preferably soaked in gasoline before applying to increase its stretchability, and then the gasket is stretched over the valve and allowed to dry, therefore it will be seen that a close peripheral engagement of the gasket with the valve is obtained, and at the same time the application of the gasket to the valve is facilitated.

The inner sides of the flanges 10 and 11 are provided with annular beads 12 to stiffen the same, and these beads in turn provided with lugs 13, which engage the upper and lower sides of the valve 7 and maintain the beads spaced from the valve surfaces so that air between the flanges and the disk surfaces will be compressed and expelled on the valve closing operation, thereby increasing the resiliency of the packing, and at the same time there is a breathing operation of the gasket when the valve is opened and closed. By providing the beads 12 it is obvious the portions of the gasket flanges between the lugs 13 will not sag into engagement with the surfaces of the valve 7 and prevent the breathing operation.

Figure 3:
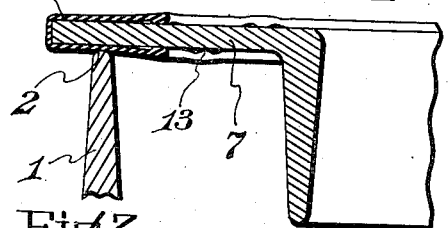
Figure 3 is an enlarged detail sectional view through one side of the disk valve and the gasket, showing the same seated on the hatch flange seat.

Referring to Figure 3 the construction and operation is the same, however in this form the under side of the disk valve is provided with an annular bead 14, which will increase the amount of air space between the flange 11 and the disk valve 7, otherwise the operation of the gasket is the same as in Figure 2 and Figure 3.

As hatch covers of this type are slammed to closed position, it will be seen that the air cushioning assists in preventing damage to the gasket.

Figure 5:
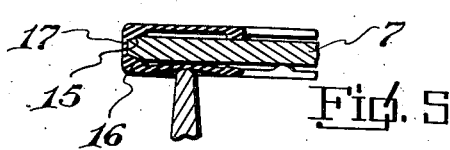
Figure 5 is a modified form of valve shown in section along with the gasket.

Referring to Figure 5, in this form, the outer edges 15 of the disk valve 7 are bevelled and tightly seated in a channel 16 in the outer wall 17 of the gasket for preventing leakage, hence it will not be necessary to machine the under side of the disk valve.

From the above it will be seen that a gasket is provided for disk valves which may be easily applied thereto without the use of special machining of the valve and special holding means for the gasket as is now the common practice. It will also be seen that when the lower flange becomes worn the gasket may be turned over and the other flange utilized for cooperation with the valve seat.

The invention having been set forth what is claimed as new and useful is:

1. The combination with a disk valve, of a channeled contractible gasket surrounding said valve with one of its flanges above and the other below said valve, at least one of said flanges having its free edge stiffened by a bead and lugs carried by the bead and engaging the adjacent surface of the valve for maintaining the bead spaced from the valve.

2. A device as set forth in claim 1 wherein the remaining flange is provided with a similar bead and lugs.

3. A device as set forth in claim 1 including an auxiliary channel in the bottom of the channeled gasket and forming a leakproof connection between the marginal edge of the valve and the gasket.

PHILLIPS B. DRANE.